(12) United States Patent  (10) Patent No.: US 7,856,640 B2
Brooks et al.  (45) Date of Patent: *Dec. 21, 2010

(54) WEB CLIENT ENDPOINT EMULATOR

(75) Inventors: Patrick Joseph Brooks, Toronto (CA); Rhonda L. Childress, Austin, TX (US); Michael John Spisak, East Northport, NY (US)

(73) Assignee: International Business Machines Corporation, Armonk, NY (US)

( * ) Notice: Subject to any disclaimer, the term of this patent is extended or adjusted under 35 U.S.C. 154(b) by 170 days.

This patent is subject to a terminal disclaimer.

(21) Appl. No.: 12/244,392

(22) Filed: Oct. 2, 2008

(65) Prior Publication Data
US 2009/0031331 A1 Jan. 29, 2009

Related U.S. Application Data

(63) Continuation of application No. 11/077,340, filed on Mar. 10, 2005, now Pat. No. 7,484,226.

(51) Int. Cl.
G06F 13/00 (2006.01)

(52) U.S. Cl. ......... 719/330; 703/23
(58) Field of Classification Search ......... 719/330; 703/23
See application file for complete search history.

(56) References Cited

U.S. PATENT DOCUMENTS

| | | | |
|---|---|---|---|
| 6,457,066 B1 | 9/2002 | Mein et al. | |
| 6,732,191 B1 | 5/2004 | Baker et al. | |
| 7,159,224 B2 | 1/2007 | Sharma et al. | |
| 7,516,052 B2* | 4/2009 | Hatcherson et al. | 703/6 |
| 2002/0046239 A1 | 4/2002 | Stawikowski et al. | |
| 2003/0014766 A1 | 1/2003 | Dinwiddie et al. | |
| 2003/0093468 A1 | 5/2003 | Gordon et al. | |
| 2003/0110167 A1 | 6/2003 | Kim | |
| 2003/0182624 A1 | 9/2003 | Large | |
| 2006/0047665 A1* | 3/2006 | Neil | 707/10 |
| 2009/0300578 A1* | 12/2009 | Neil | 717/104 |

OTHER PUBLICATIONS

USPTO; examination correspondence in related U.S. Appl. No. 11/077,340, now U.S. patent 7,484,226, filed on Mar. 10, 2005, by Patrick Joseph Brooks.
Christensen, Erik, et al., "Web Services Description Language (WSDL) 1.1", downloaded on Feb. 23, 2005.

* cited by examiner

*Primary Examiner*—Andy Ho
(74) *Attorney, Agent, or Firm*—Robert H. Frantz; David A. Mims, Jr.; Mark C. Vallone

(57) ABSTRACT

A web services endpoint emulator for testing and developing web server client program, which generates emulator service classes according to service descriptor files, the classes being contained in a web container accessible by a web server; receives by the web server a request from a client process via an emulator interface; parses the request and any associated parameters; retrieves endpoint service descriptor files according to the parsed request and parameters; executes by a web server a service response script while evaluating the retrieved endpoint service descriptor files to generate a response; and sends from the web server the generated response to the client process via the emulator interface.

18 Claims, 7 Drawing Sheets

```
<script_response_statement>       ⌒21
    <IF>   Input (a) = "estimate"   ⌒22
       <THEN>  return_value = x     ⌒23
       <ELSE>  return_value = y     ⌒24
       </THEN>
       </ELSE>
    </IF>
</script_response_statement>
```

Figure 2

Sample WSDL for a Simple Automobile Loan Calculator

```
<?xml version="1.0" encoding="UTF-8"?>
<wsdl:definitions name="LoanCalc1"
   targetNamespace="http://LoanCalc1-Interface"
   xmlns="http://schemas.xmlsoap.org/wsdl/"
   xmlns:impl="http://LoanCalc1"
   xmlns:intf="http://LoanCalc1-Interface"
   xmlns:soap="http://schemas.xmlsoap.org/wsdl/soap/"
   xmlns:soapenc="http://schemas.xmlsoap.org/soap/encoding/"
   xmlns:wsdl="http://schemas.xmlsoap.org/wsdl/"
   xmlns:xsd="http://www.w3.org/2001/XMLSchema">

<wsdl:message name="LoanCalc1Request">
   <wsdl:part name="loan_amount" type="xsd:string"/>
   <wsdl:part name="interest_rate" type="xsd:string"/>
   <wsdl:part name="term" type="xsd:string"/>
</wsdl:message>

<wsdl:message name="LoanCalc1Response">
   <wsdl:part name="monthly_payment" type="xsd:string"/>
</wsdl:message>

<wsdl:portType name="LoanCalc1PortType">
   <wsdl:operation name="calcLoan">
      <wsdl:input message="intf:LoanCalc1Request"/>
      <wsdl:output message="intf:LoanCalc1Response"/>
   </wsdl:operation>
</wsdl:portType>

<wsdl:binding name="LoanCalc1SoapBinding" type="intf:LoanCalc1PortType">
   <soap:binding style="rpc" transport="http://schemas.xmlsoap.org/soap/http"/>
   <wsdl:operation name="calcLoan">
      <soap:operation soapAction="urn:LoanCalc1" style="rpc"/>
      <wsdl:input>
```

Figure 6a

Sample WSDL for a Simple Automobile Loan Calculator (cont.)

```
        <soap:body encodingStyle="http://schemas.xmlsoap.org/soap/encoding/"
            namespace="http://LoanCalc1-Interface" use="encoded"/>
      </wsdl:input>
      <wsdl:output>
        <soap:body encodingStyle="http://schemas.xmlsoap.org/soap/encoding/"
            namespace="http://LoanCalc1-Interface" use="encoded"/>
      </wsdl:output>
    </wsdl:operation>
  </wsdl:binding>
  <wsdl:service name="LoanCalc1">
    <documentation>A Simple Auto Loan Calculator</documentation>
    <wsdl:port binding="intf:LoanCalc1SoapBinding" name="LoanCalc1Port">
      <soap:address location="http://localhost:8080/soap/servlet/rpcrouter"/>
    </wsdl:port>
  </wsdl:service>
</wsdl:definitions>
```

Figure 6b

WEB CLIENT ENDPOINT EMULATOR

CROSS-REFERENCE TO RELATED APPLICATIONS (CLAIMING BENEFIT UNDER 35 U.S.C. 120)

This application is a continuation of U.S. patent application Ser. No. 11/077,340, now U.S. Pat. No. 7,484,226, filed on Mar. 10, 2005, by Patrick Joseph Brooks.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related U.S. patent application Ser. No. 11/077,340, now U.S. Pat. No. 7,484,226, filed on Mar. 10, 2005, by Patrick Joseph Brooks is hereby incorporated by reference in its entirety. "Web Services Description Language (WSDL) 1.1", adopted by W3C consortium on Mar. 15, 2001, authored by Francisco Curbera, et al, and published on the W3C organization's web site is hereby incorporated by reference in its entirety.

BACKGROUND OF THE INVENTION

1. Field of the Invention

This application is a continuation of U.S. patent application Ser. No. 11/077,340, now U.S. Pat. No. 7,484,226, filed on Mar. 10, 2005, by Patrick Joseph Brooks. This invention relates to technologies for assisting in the development of web-based application programs, and especially to development of application programs intended for execution by on-demand computing platforms.

2. Background of the Invention

As business demand increases, the depth of technology improvements and its intelligence to handle multiple processes becomes highly desirable and crucial. In any enterprise operation, it is difficult to effectively manage the ever-fluctuating resources available, while maximizing the resource utilization.

In fact, Information Technology ("IT") costs can become very expensive when maintaining sufficient resources to meet peak requirements. Furthermore, user inputs are generally required to facilitate such processes, which incurs additional costs in both time and human resource demand.

To address these needs, many large vendors of enterprise computing systems, such as International Business Machines ("IBM"), Hewlett-Packard ("HP"), Microsoft Corporation, and Sun Microsystems ("Sun"), have begun to develop and deploy infrastructure technologies which are self-managing and self-healing. Self-managed infrastructures enable a business model whereby customers or clients have their application programs executed in a manner which consumes a dynamic or time-variant set of resources, thereby allowing the services to be delivered at a cost which is tailored to the actual real-time need or demand for the customer's data processing.

These various self-managed infrastructure initiatives are known by a variety of names. HP's self-managed computing architecture is referred to "Utility Computing" or "Utility Data Center", while Sun has dubbed their initiative "N1". IBM has applied terms such as "Autonomic Computing", "Grid Computing", and "On-Demand Computing" to their various architecture and research projects in this area. While each vendor has announced differences in their approaches and architectures, each shares the goal of providing large-scale computing systems which self-manage and self-heal to one degree or another.

For example, IBM's Autonomic Computing is a self-managing computing model which is patterned on the human body's autonomic nervous system, controlling a computing environment's application programs and platforms without user input, similar to the way a human's autonomic nervous system regulates certain body functions without conscious decisions.

Additionally, IBM has defined their On-Demand Computing technology as an enterprise whose business processes, integrated end-to-end across the company and with key partners, suppliers, and customers, can respond quickly to any customer demand, market opportunity, or external threat. Throughout our present disclosure, we will refer collectively to these types of new computing infrastructures as "on-demand" systems and architectures.

Developing application programs for these new infrastructures is especially challenging, as many needed logical components are used from other servers on a real-time basis. Testing new application programs can be extremely challenging, as access to a full on-demand system may not be possible or economically feasible, as these systems in their final form tend to be quite large and expensive.

During the creation of web service clients, orchestrated and choreographed service clients, and business processes that leverage web services, it can be extremely difficult to test the client and process functionality in the earlier stages of web services client development. This is because the web services endpoint that the client program will be accessing may have bugs, may still be in development, may be locked behind firewall, or may simply not be accessible during the client development. A web services endpoint can be any computing resource which performs a function on behalf of the client program upon the client program's request, usually based upon data supplied by the client program. Endpoints are often "back office" types of processes and programs which are not intended to interface directly to a human user, but instead are intended to provide some functionality to programs (e.g. client programs) which do interface to the human user, such as calculating mortgage costs, searching for financial instruments, etc.

In order to test web services clients today in the new on-demand computing environments, client programs must access the intended service or a test instance of that service. Actually accessing the endpoint service allows validation that the client program under development implements the web service description accurately, and that the client program can process responses and faults properly. This approach, however, assumes and requires that the client development team has access to each "live" service endpoint program instance, which is often not the case. Additionally, it is not always financially practical to setup a physical "test" environment to allow for web service client testing.

A considerable drawback to alternate methods for testing on-demand client programs during development relates the capability of the computing infrastructure available to the development team. During the development of web services, it often is not realistic to assume the development team will have access to the other web services to which their new program must interface. Although a typical web service may be emulated in a rudimentary sense, it is often not possible to vary or change the simulated output from the various web services without extra programming and development.

Another approach which allows full testing across a variety of scenarios and test cases requires installation of a local copy of the service environment to make the various needed endpoints accessible to the client program under development, which may require installation of an entire on-demand infrastructure, including database programs, custom programs, computing platforms, disk arrays, etc. This can be prohibitively expensive, and may not be within the skill capabilities of the development team as many of these system components may require experts for their installation and configuration.

SUMMARY OF THE INVENTION

A web services endpoint emulator for testing and developing web server client program which generates emulator service classes according to service descriptor files, the classes being contained in a web container accessible by a web server; receives by the web server a request from a client process via an emulator interface; parses the request and any associated parameters; retrieves endpoint service descriptor files according to the parsed request and parameters; executes by a web server a service response script while evaluating the retrieved endpoint service descriptor files to generate a response; and sends from the web server the generated response to the client process via the emulator interface.

BRIEF DESCRIPTION OF THE DRAWINGS

The following detailed description when taken in conjunction with the figures presented herein provide a complete disclosure of the invention.

FIG. 2 illustrates a portion of a response script according to one aspect of the invention.

FIGS. 6a and 6b provide sample WDSL code for a simple automobile loan calculator for purposes of illustration of an endpoint function which can be emulated by the present invention.

DESCRIPTION OF THE INVENTION

Figure 1:
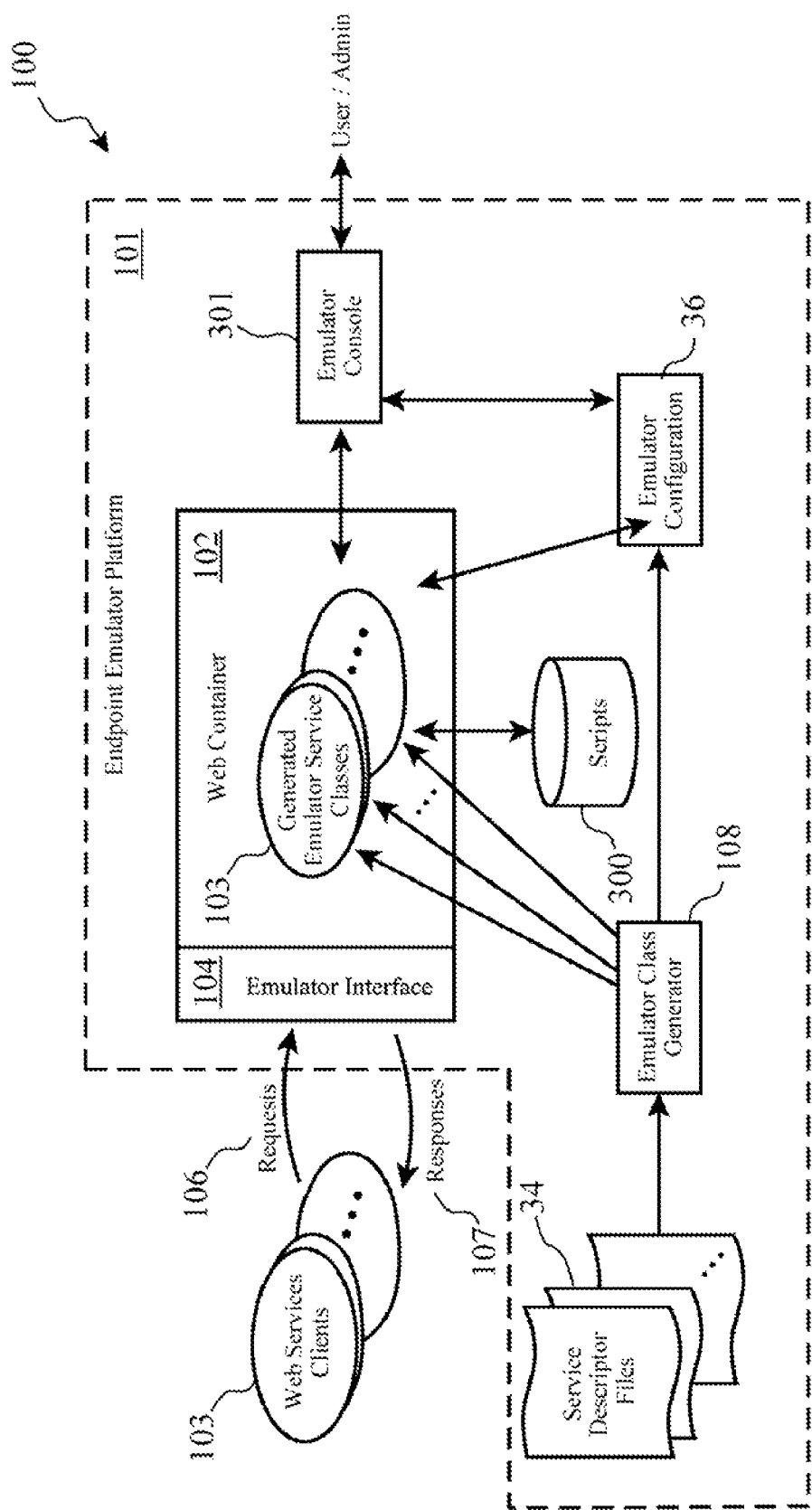
FIG. 1 illustrates the system architecture of the web services endpoint emulator invention.

The present invention provides a flexible, configurable platform for endpoint emulation which allows simulation of an on-demand web service endpoint for use during development and testing of new client programs and web services, without requiring actual access to or use of the computing resources associated with the real endpoint service. Our endpoint emulation platform has the ability to respond to client requests and queries as if it were the "real" web service endpoint, including message responses and faults. By providing a service endpoint emulated environment, the invention allows web service clients to perform early unit testing without having to access production resources or "guess" about service interaction.

In the following paragraphs, many components, standards, formats, and protocols will be described with respect to one or more embodiments of the invention, and particularly to products and platforms from IBM which implement self-managed computing environment concepts and infrastructures. It will be appreciated by those skilled in the art, however, that the present invention may be realized in alternate forms utilizing and employing components from other vendors and sources, especially in light of the use of multiple open standards, without departing from the scope of the present invention.

Endpoint Service Descriptors

According to one aspect of a preferred embodiment, our service endpoint emulation platform interfaces to client programs using a message-based protocol, and it determines message responses and formatting according to Web Services Description Language ("WSDL") documents supplied by the service endpoint provider. Each WSDL document contains all the necessary information that allows the service endpoint emulator to react like the real service endpoint. Emulated responses may be pre-configured, configured based on the client request, or "live" responses acquired from an operator by means of an input screen.

Web Services Description Language, based on eXensible Markup Language ("XML"), is an open standard for describing business process offers, and for providing a mechanism for other logical processes to access those services electronically. WSDL is a key component of the Universal Description, Discovery, and Integration ("UDDI") initiative which is being jointly promoted by companies such as International Business Machines ("IBM"), Microsoft Corp., and others. UDDI, also based on XML, provides a registry for electronic businesses anywhere in the world, including their offered endpoint services on the Internet.

WSDL is related to the well known Simple Object Access Protocol ("SOAP") and to IBM's Network Accessible Service Specification Language ("NASSL"), and provides similar functionality to the well known Common Object Request Broker Architecture ("CORBA"), albeit in a manner which employs communication protocols, schemes, and document formats which are much less proprietary and much more compatible with Internet technologies. As such, it is intended that WSDL will replace NASSL, SOAP, and even CORBA. FIGS. 6a and 6b provide example WDSL code for a simple automobile loan calculator.

Computing Platform for Endpoint Emulator

The present invention may be realized as software executing on a suitable computing platform, and especially executing on a web server computer of a suitable type. These common computing platforms can include personal computers, higher-end enterprise class systems, as well as portable computing platforms, such as personal digital assistants ("PDA"), web-enabled wireless telephones, and other types of personal information management ("PIM") devices, provided that such portable or lower-end systems have the requisite processing and communications bandwidth. Therefore, it is useful to review a generalized architecture of a computing platform which may span the range of implementation, from a high-end web or enterprise server platform, to a personal computer, to a portable PDA or web-enabled wireless phone.

Figure 4:
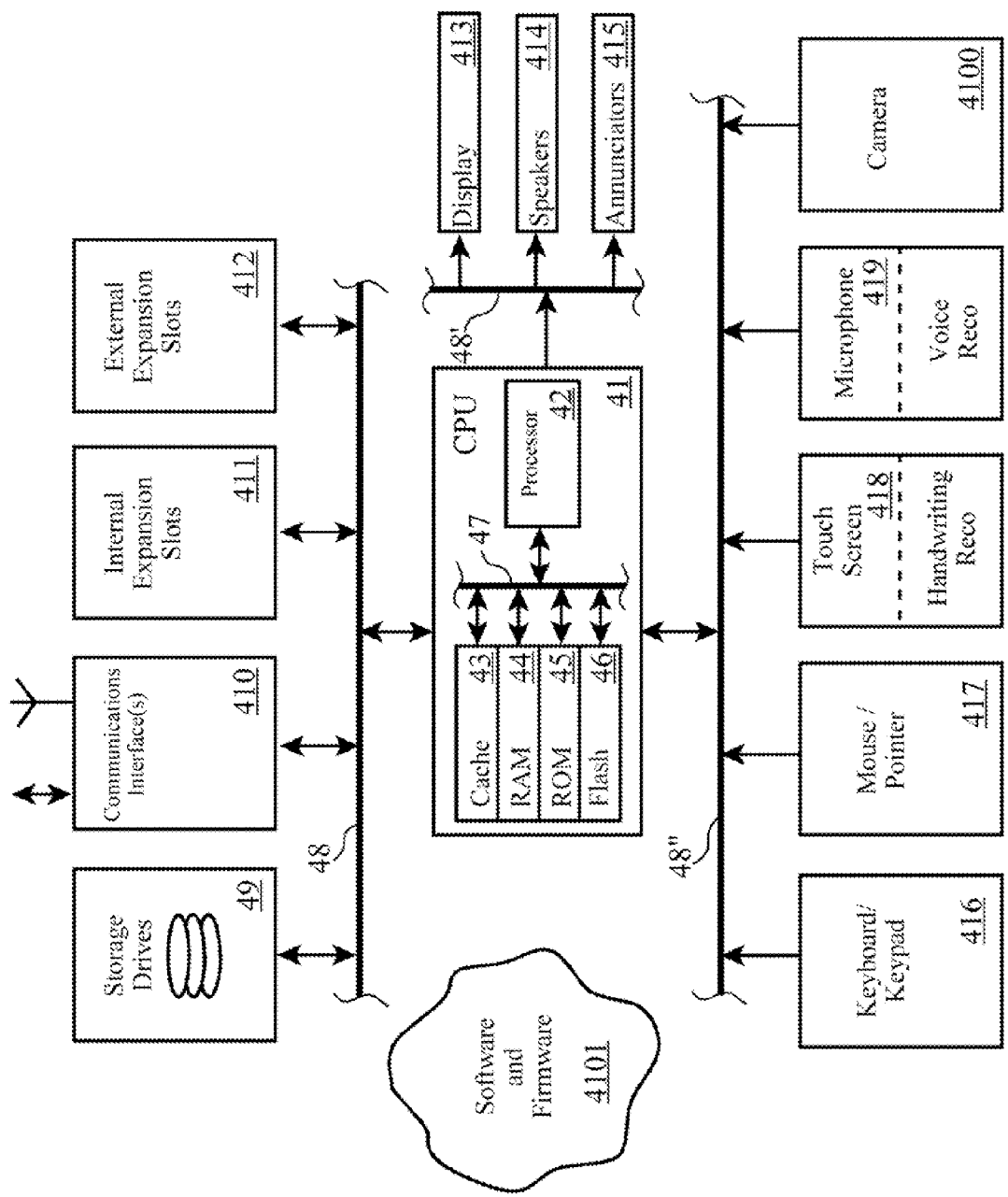
FIG. 4 depicts a generalized computing platform architecture, such as a personal computer, web server computer, personal digital assistant, web-enabled wireless telephone, or other processor-based device.

Turning to FIG. 4, a generalized architecture is presented including a central processing unit (41) ("CPU"), which is typically comprised of a microprocessor (42) associated with random access memory ("RAM") (44) and readonly memory ("ROM") (45). Often, the CPU (41) is also provided with cache memory (43) and programmable FlashROM (46). The interface (47) between the microprocessor (42) and the various types of CPU memory is often referred to as a "local bus", but also may be a more generic or industry standard bus. Many computing platforms are also provided with one or more storage drives (49), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network. "Computer readable memory devices" shall refer to all types of storage memory devices which may store software and programs excepting only transitory propagating signals as "computer readable memory devices".

Many computing platforms are provided with one or more communication interfaces (410), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too. Computing platforms are often equipped with one or more internal expansion slots (411), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (412) allowing the user the ability to easily install and remove hardware expansion devices, such as PCMCIA cards, SmartMedia cards, and various proprietary modules such as removable hard drives, CD drives, and floppy drives.

Often, the storage drives (49), communication interfaces (410), internal expansion slots (411) and external expansion slots (412) are interconnected with the CPU (41) via a standard or industry open bus architecture (48), such as ISA, EISA, or PCI. In many cases, the bus (48) may be of a proprietary design. A computing platform is usually provided with one or more user input devices, such as a keyboard or a keypad (416), and mouse or pointer device (417), and/or a touch-screen display (418). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (418) is usually provided, often with handwriting recognition capabilities.

Additionally, a microphone (419), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (4100), such as a still digital camera or full motion video digital camera. One or more user output devices, such as a display (413), are also provided with most computing platforms. The display (413) may take many forms, including a Cathode Ray Tube ("CRT"), a Thin Flat Transistor ("TFT") array, or a simple set of light emitting diodes ("LED") or liquid crystal display ("LCD") indicators.

One or more speakers (414) and/or annunciators (415) are often associated with computing platforms, too. The speakers (414) may be used to reproduce audio and music, such as the speaker of a wireless telephone or the speakers of a personal computer. Annunciators (415) may take the form of simple beep emitters or buzzers, commonly found on certain devices such as PDAs and PIMs.

These user input and output devices may be directly interconnected (48', 48") to the CPU (1) via a proprietary bus structure and/or interfaces, or they may be interconnected through one or more industry open buses such as ISA, EISA, PCI, etc.

The computing platform is also provided with one or more software and firmware (4101) programs to implement the desired functionality of the computing platforms. Turning to now FIG. 5, more detail is given of a generalized organization of software and firmware (4101) on this range of computing platforms. One or more operating system ("OS") native application programs (53) may be provided on the computing platform, such as word processors, spreadsheets, contact management utilities, address book, calendar, email client, presentation, financial and bookkeeping programs.

Additionally, one or more "portable" or device-independent programs (54) may be provided, which must be interpreted by an OS-native platform-specific interpreter (55), such as Java[™] scripts and programs. Often, computing platforms are also provided with a form of web browser or micro-browser (56), which may also include one or more extensions to the browser such as browser plug-ins (57).

The computing device is often provided with an operating system (50), such as IBM's AIX or OS/2, Microsoft Windows [™], UNIX, LINUX, MAC OS[™] or other platform specific operating systems. Smaller devices such as PDA's and wireless telephones may be equipped with other forms of operating systems such as real-time operating systems ("RTOS") or Palm Computing's PalmOS[™].

A set of basic input and output functions ("BIOS") and hardware device drivers (21) are often provided to allow the operating system (20) and programs to interface to and control the specific hardware functions provided with the computing platform.

Additionally, one or more embedded firmware programs (52) are commonly provided with many computing platforms, which are executed by onboard or "embedded" microprocessors as part of the peripheral device, such as a micro controller or a hard drive, a communication processor, network interface card, or sound or graphics card.

Figure 5:
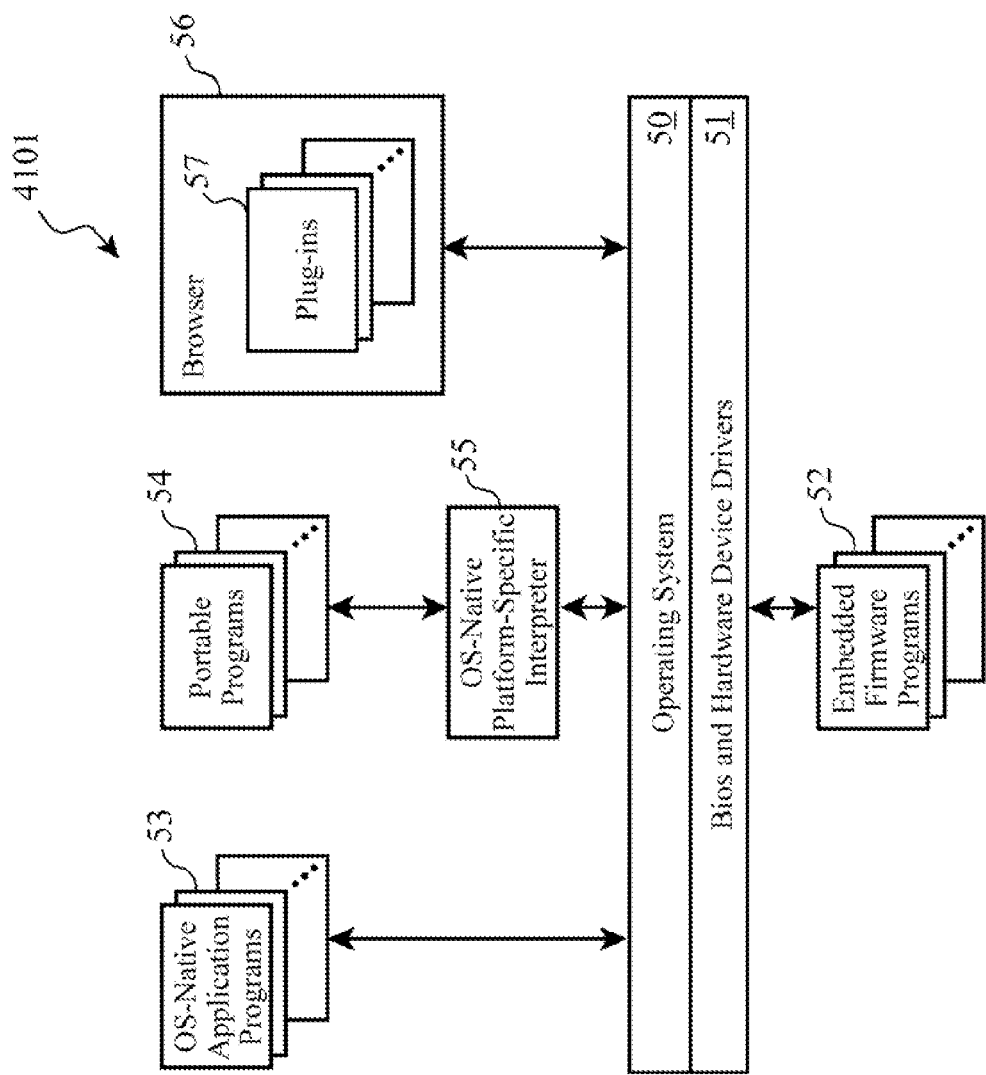
FIG. 5 shows a generalized organization of software and firmware associated with the generalized architecture of FIG. 5.

As such, FIGS. 4 and 5 describe in a general sense the various hardware components, software and firmware programs of a wide variety of computing platforms, including but not limited to personal computers, web servers, enterprise computers, PDAs, PIMs, web-enabled telephones, and other appliances such as WebTV[™] units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Web Server Platform for Endpoint Emulator

The invention is preferably realized as software additions to a web server product, and preferably the IBM WebSphere Application Server ("WAS") based upon the open Eclipse initiative. The Eclipse initiative is an open platform and tool for integration, defined by an open community of tool providers such as Borland[™], International Business Machines ("IBM"), and Red Hat[™]. It is designed to build integrated development environments ("IDEs") which allow the creation of diverse end-to-end computing solutions for multiple computer environments while providing flexibility and management for developers in their software technology.

According to the Eclipse Foundation, it has formed an independent open "eco-system" around royalty-free technology and a universal platform for tools integration. The Eclipse platform is a mechanism for discovering, integrating, and running modules called plug-ins based on the foundation's white paper. The plug-in based framework enables ease in creation, integration, and utilization of software tools. Developers have the privilege to choose in a multi-language, multi-platform, multi-vendor environment. The base Eclipse Platform is written in Java language and comes with extensive plug-in construction tool kits and examples. It has been deployed on a range of development workstations including Linux, HP-UX, AIX, Solaris, QNX, OSx, and Windows based systems. In the following paragraphs, it shall be understood that references to Eclipse are to one available embodiment, and that use of alternate platform and methodologies may be employed without departing from the spirit and scope of the invention.

Logical Processes of the Invention

The logical processes of the present invention are preferably realized as software programs in conjunction with the aforementioned computing platforms and environments. Alternatively, all or part of the logical processes of the invention may also be realized as in electronic circuitry.

Figure 3:
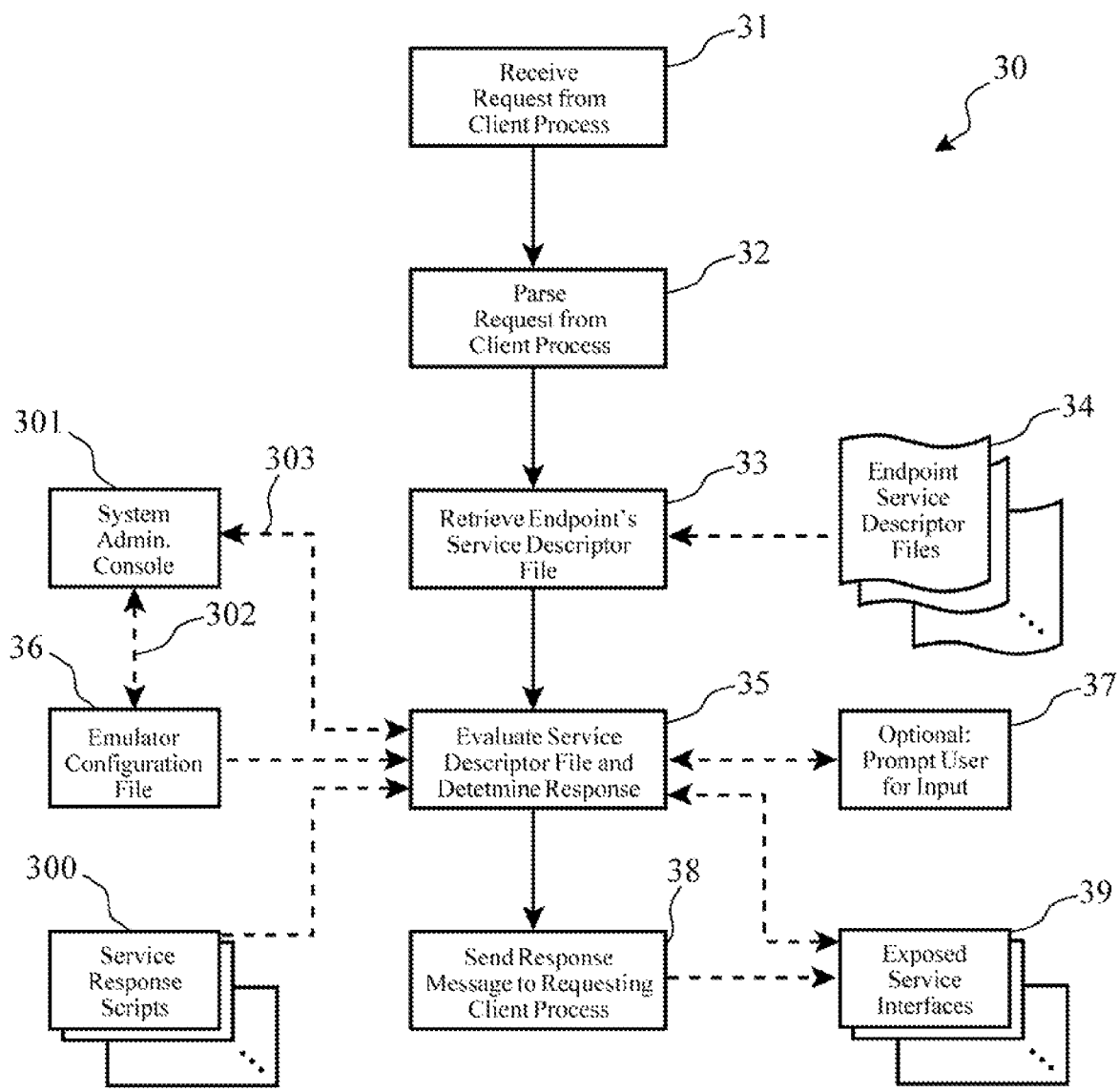
FIG. 3 depicts a logical process according to the present invention.

A shown in FIG. 3, the logical processes of the invention provide web service endpoint "emulation" by interrogating (34) the actual or "real" endpoint service's service descriptor files (34) (e.g. WSDL files) to determine (35) the endpoint's input messages (31) and output messages (38), including message formats, for the services that it offers.

For each service descriptor file describing an emulated endpoint service, the invention generates a concrete service interface (39) and makes it available for client consumption. For each exposed service interface, the invention provides configuration options (36) for emulating this service. Those options preferably include pre-configured responses, or the ability to prescript the service response from a configuration file.

Additionally, responses may be scripted (300) based on the request received (31) by the emulated service. For example, as shown (20) in FIG. 2, if (22) the value of the service request parameter A is equal to "estimate" then respond with value or variable "x" (23), otherwise respond with value or variable "y" (24). Returning to FIG. 3 and further according to another aspect of the present invention, a manual response option is available which allows for a human operator to be prompted (37) for return values. The human operator may input responses, even in real time, as client requests are received and handled by the emulator. The responses will then be properly formatted into a return or output message from the emulator to the requesting client program.

System Administration

The invention preferably provides a web-based console (301) through which an administrator can establish or modify system-wide configuration options (36), initialize new emulated services (303), alter emulated service configuration (303), or remove emulated services (303).

In an alternate embodiment, this same console (301) may be used to prompt the user for real-time response input (37), thereby allowing the invention to host or emulate several service endpoints for many different services simultaneously in order to create a lifelike services environment without the overhead, cost and complexity of actually installing and provisioning all of the needed "real" services.

Endpoint Emulator Architecture

Turning to FIG. 1, the overall architecture (100) of the present invention is shown. The generated Emulator Service Classes (103) (or 'stubs') reside and are exposed in a standard web container (102), while the other components of endpoint emulator reside external to the web container (102). This is so that service stubs (103) may be hosted and tested using a variety of available server implementations.

According to the preferred embodiment, the Simple Object Access Protocol ("SOAP") is adopted because of it's message-based interface (106, 107) to web services clients (105), and because of the wide availability of SOAP-compliant components from many vendors, such as servers, protocol stacks, etc. SOAP allows a program running in operating system, such as IBM's AIX, to communicate with and interact with a program running in the same or in another operating system, such as Linux or Microsoft Windows, utilizing Hypertext Transfer Protocol ("HTTP") and XML as the mechanisms for message exchange. HTTP and XML are components widely available on web servers, and as such, SOAP makes a good solution for realizing the present invention. SOAP specifies exactly how a requesting client must encode an HTTP header and an XML file in order to "call" or remotely invoke another program, often in another computer, and how the requesting client can pass information to the invoked program. SOAP specifies how the invoked program will return its response to the requesting client, as well.

One advantage of SOAP is that firewall servers typically handle SOAP requests more eloquently, and refuse far fewer SOAP requests than other protocol requests, such as protocols that rely upon exposed IP ports. As such, the invention is preferably realized as a logical process in conjunction with an available SOAP-compliant webserver, such as IBM's WebSphere[™] Application Server, the Apache Software Foundation's Tomcat server, BEA Systems' WebLogic[™] server, or similar. Other similar technologies, however, such as CORBA, could be utilized in addition to or instead of SOAP, in alternate embodiments.

CONCLUSION

As more "on demand" services are developed in order to leverage the emerging self-managed computing environments' capabilities, the present invention, an endpoint web services emulator, will be instrumental in reducing the time and cost of development and test cycles for new emerging service clients, by allowing on-demand service developers to test their clients prior to "live" on-demand deployment, and without the need for a fully configured and provisioned on-demand computing environment.

The foregoing paragraphs have described the present invention with certain embodiment examples. It will be recognized by those skilled in the art, however, that these example embodiments do not represent the scope of the present invention, and that alternate embodiment choices may be made without departing from the spirit and scope of the present invention. Thus, the scope of the invention should be determined by the following claims

What is claimed is:

1. A system for networked computer services endpoint service emulation comprising:
   a computer memory device containing one or more service descriptor files;
   an emulator class generator portion of a web server computer platform configured to generate one or more service classes according to the service descriptor files; and
   a web container disposed in computer memory of a web server platform, the web container containing the generated service classes are contained, and having an emulator interface communicable to one or more web client computers, and configured to execute one or more service response scripts associated with said contained emulator service classes upon request and in response to the web client computer.

2. The system as set forth in claim 1 wherein the service descriptor files comprise Web Services Description Language.

3. The system as set forth in claim 1 further comprising an emulator console having a human interface.

4. The system as set forth in claim 3 further comprising an emulator configuration data structure, the configuration data structure being modifiable using the human interface.

5. The system as set forth in claim 3 wherein the services response scripts provide one or more prompts to a user via said human interface for input or response selection during executing of said emulator script.

6. The system as set forth in claim 1 further comprising an interface exposer configured to expose interfaces to the emulator service classes for consumption by processes being executed by the web services client via the emulator interface.

7. A computer-implemented method for emulation of an endpoint service in a network computer arrangement comprising:
   generating in a computer readable memory device one or more emulator service classes according to one or more service descriptor files, the generated service classes being contained in a web container accessible by a web server platform;
   receiving by a web server computer platform a request from a client process via an emulator interface;
   parsing the request and any associated parameters;
   retrieving one or more endpoint service descriptor files according to the parsed request and parameters;
   executing by a web server computer platform a service response script while evaluating the retrieved endpoint service descriptor files to generate a response; and
   sending by a web server computer platform the generated response to the client process via the emulator interface.

8. The method as set forth in claim 7 the generating emulator service classes comprises generating an emulator service class according to one or more Web Services Description Language descriptors.

9. The method as set forth in claim 7 further comprising providing an emulator console having a human interface.

10. The method as set forth in claim 9 further comprising providing an emulator configuration data structure, the configuration data structure being modifiable using the human interface.

11. The method as set forth in claim 9 further comprising providing one or more prompts to a user via said human interface for input or response selection during executing of the emulator script.

12. The method as set forth in claim 7 further comprising exposing interfaces to the emulator service classes for consumption by processes being executed by the web services client via said emulator interface.

13. A computer program product for emulation of an endpoint service in a network computer arrangement, comprising:
   a non-transitory computer readable memory device suitable for encoding computer programs; and
   a computer program product comprising:
      first program instructions to generate one or more emulator service classes according to one or more service descriptor files, the generated service classes being contained in a web container accessible by a web server platform;
      second program instructions to receive a request from a client process via an emulator interface;
      third program instructions to parse the request and any associated parameters;
      fourth program instructions to retrieve one or more endpoint service descriptor files according to the parsed request and parameters;
      fifth program instructions to execute a service response script while evaluating the retrieved endpoint service descriptor files to generate a response; and
      sixth program instructions to send the generated response to said client process via the emulator interface;
   wherein the first, second, third, fourth, fifth and sixth program instructions are stored by the non-transitory computer readable memory device.

14. The computer program product as set forth in claim 13 wherein the software for generating emulator service classes comprises program configured to generate an emulator service class according to one or more Web Services Description Language descriptors.

15. The computer program product as set forth in claim 13 further comprising program configure to provide an emulator console having a human interface.

16. The computer program product as set forth in claim 15 further comprising program configured to provide an emulator configuration data structure, the configuration data structure being modifiable using the human interface.

17. The computer program product as set forth in claim 15 further program configured to provide one or more prompts to a user via the human interface for input or response selection during executing of said emulator script.

18. The computer program product as set forth in claim 13 further comprising program configured to expose interfaces to the emulator service classes for consumption by processes being executed by the web services client via the emulator interface.

* * * * *